US012603497B2

(12) United States Patent
 Oki

(10) Patent No.: US 12,603,497 B2
(45) Date of Patent: Apr. 14, 2026

(54) CONTROL APPARATUS, CONTROL METHOD, AND NON-TRANSITORY COMPUTER READABLE MEDIUM FOR OCCUPANT-BASED ENERGY PREDICTION

(71) Applicant: TOYOTA JIDOSHA KABUSHIKI KAISHA, Toyota (JP)

(72) Inventor: Hiroshi Oki, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 598 days.

(21) Appl. No.: 18/153,100

(22) Filed: Jan. 11, 2023

(65) Prior Publication Data

US 2023/0223754 A1 Jul. 13, 2023

(30) Foreign Application Priority Data

Jan. 11, 2022 (JP) ................................. 2022-002632

(51) Int. Cl.
 *H02J 3/00* (2026.01)
 *G06T 7/20* (2017.01)
 *H02J 105/12* (2026.01)

(52) U.S. Cl.
 CPC ................ *H02J 3/003* (2020.01); *G06T 7/20* (2013.01); *G06T 2207/30196* (2013.01); *H02J 2105/12* (2026.01)

(58) Field of Classification Search
 CPC ......... G06Q 10/04; H02J 3/003; G05B 15/02;

G05B 2219/2639; G05B 19/042; G05B 2219/2614; G05B 2219/2642; F24F 2120/10; F24F 11/30; F24F 11/64

See application file for complete search history.

(56) References Cited

U.S. PATENT DOCUMENTS

| | | | | |
|---|---|---|---|---|
| 6,581,025 B2 * | 6/2003 | Lehman | ................ | H04L 41/064 |
| | | | | 714/E11.193 |
| 2013/0103217 A1 | 4/2013 | Tadano | | |
| 2016/0016756 A1 * | 1/2016 | Elomaa | ................. | B66B 1/3446 |
| | | | | 700/275 |
| 2016/0371619 A1 * | 12/2016 | Foster | ................ | G06Q 10/0637 |
| 2018/0138742 A1 * | 5/2018 | Song | ......................... | H02J 3/14 |
| 2018/0365550 A1 * | 12/2018 | Brown | ..................... | G01V 8/20 |
| 2019/0155227 A1 * | 5/2019 | Song | ......................... | H02J 3/14 |
| 2019/0325748 A1 * | 10/2019 | Tudi | ................... | G01C 21/3697 |
| 2021/0398691 A1 * | 12/2021 | Dhamija | ................ | G16H 50/80 |

(Continued)

FOREIGN PATENT DOCUMENTS

| | | |
|---|---|---|
| JP | 2012-190292 A | 10/2012 |
| JP | 2013-020307 A | 1/2013 |

(Continued)

*Primary Examiner* — Darrin D Dunn
(74) *Attorney, Agent, or Firm* — Sughrue Mion, PLLC

(57) ABSTRACT

A control apparatus includes a controller configured to: acquire first information indicating the number of people in a target building during a predetermined time period, second information indicating electrical energy consumed in the target building during the predetermined time period, and/or third information indicating the number of people heading to the target building during the predetermined time period; and estimate, based on the first information, the second information, or the third information, a demand for electrical energy for the building during a future target time period.

18 Claims, 7 Drawing Sheets

(56) References Cited

U.S. PATENT DOCUMENTS

| | | | | |
|---|---|---|---|---|
| 2022/0004902 A1* | 1/2022 | Alhelo | ................... | G06Q 10/20 |
| 2022/0051026 A1* | 2/2022 | Singh | ........................ | G06T 7/20 |
| 2023/0409931 A1* | 12/2023 | Verteletskyi | .......... | G06F 16/906 |
| 2024/0318856 A1* | 9/2024 | Karlicek, Jr. | ............ | G01V 8/00 |

FOREIGN PATENT DOCUMENTS

| JP | 2013-093934 A | 5/2013 |
|---|---|---|
| JP | 2016-75453 A | 5/2016 |
| JP | 6091568 B1 | 3/2017 |
| JP | 2018-060386 A | 4/2018 |

* cited by examiner

Figure 3:
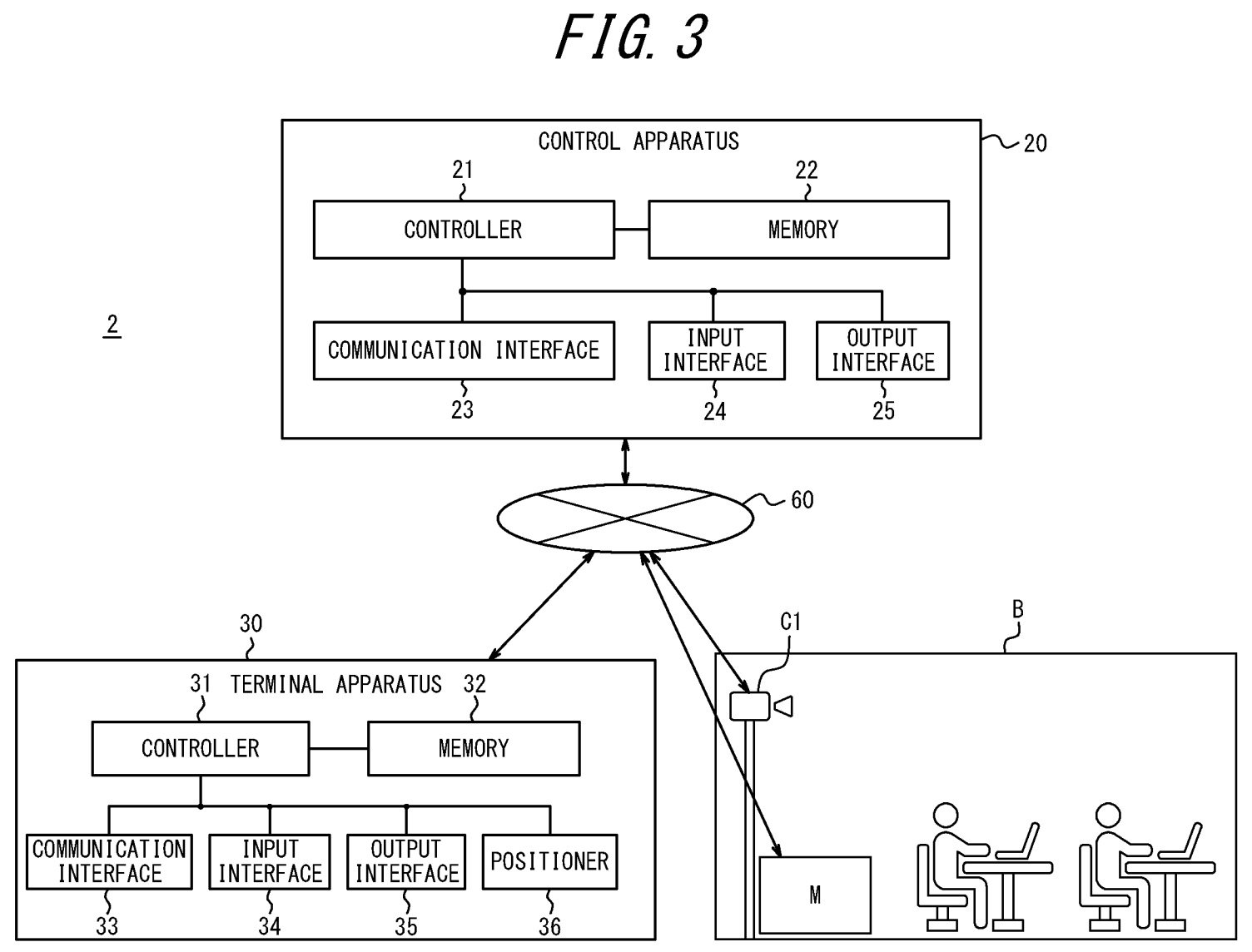

CONTROL APPARATUS 20

CONTROLLER 21

MEMORY 22

COMMUNICATION INTERFACE 23

INPUT INTERFACE 24

OUTPUT INTERFACE 25

60

TERMINAL APPARATUS 30

31

CONTROLLER

MEMORY 32

COMMUNICATION INTERFACE 33

INPUT INTERFACE 34

OUTPUT INTERFACE 35

POSITIONER 36

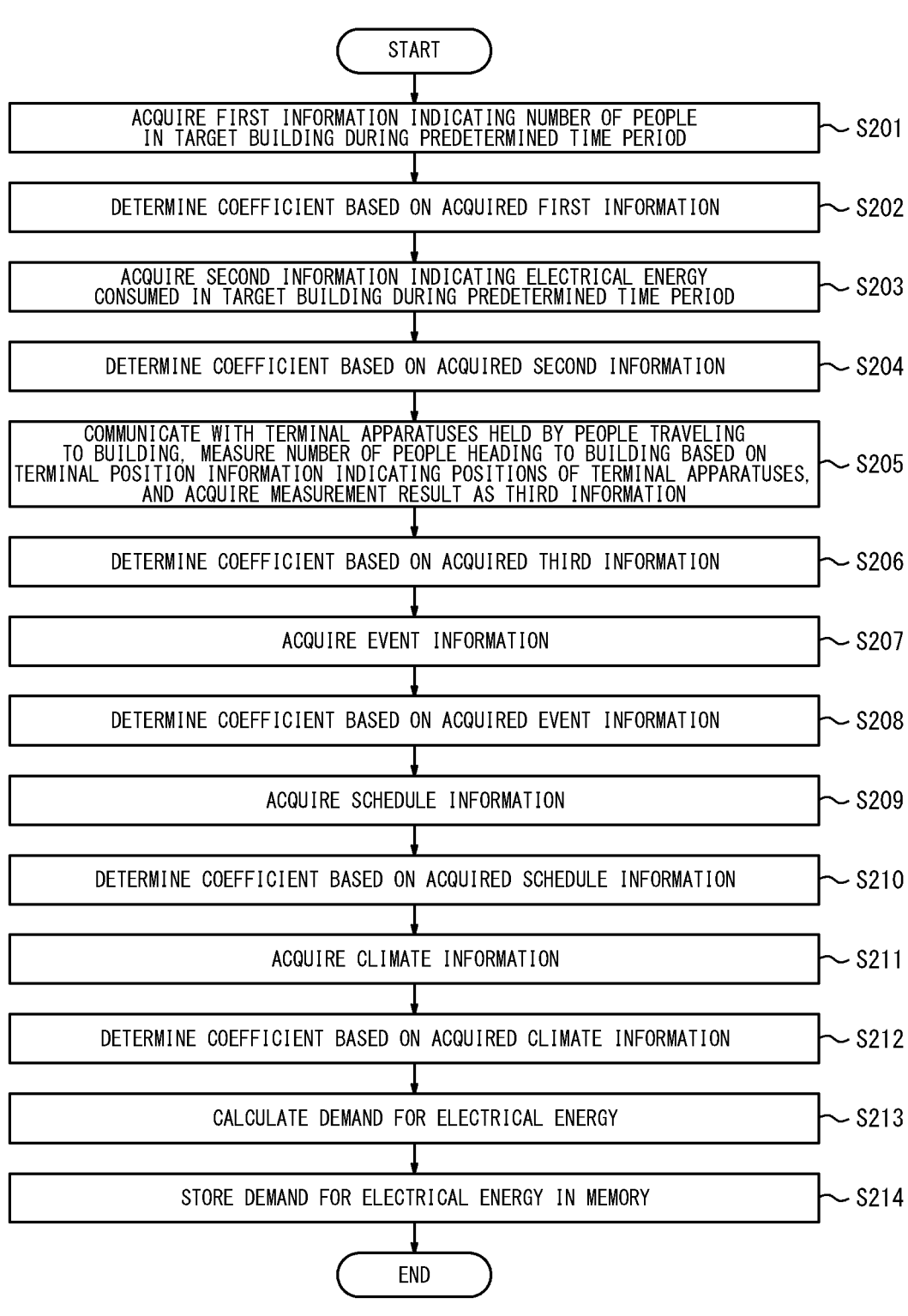

START

ACQUIRE FIRST INFORMATION INDICATING NUMBER OF PEOPLE IN TARGET BUILDING DURING PREDETERMINED TIME PERIOD — S201

DETERMINE COEFFICIENT BASED ON ACQUIRED FIRST INFORMATION — S202

ACQUIRE SECOND INFORMATION INDICATING ELECTRICAL ENERGY CONSUMED IN TARGET BUILDING DURING PREDETERMINED TIME PERIOD — S203

DETERMINE COEFFICIENT BASED ON ACQUIRED SECOND INFORMATION — S204

COMMUNICATE WITH TERMINAL APPARATUSES HELD BY PEOPLE TRAVELING TO BUILDING, MEASURE NUMBER OF PEOPLE HEADING TO BUILDING BASED ON TERMINAL POSITION INFORMATION INDICATING POSITIONS OF TERMINAL APPARATUSES, AND ACQUIRE MEASUREMENT RESULT AS THIRD INFORMATION — S205

DETERMINE COEFFICIENT BASED ON ACQUIRED THIRD INFORMATION — S206

ACQUIRE EVENT INFORMATION — S207

DETERMINE COEFFICIENT BASED ON ACQUIRED EVENT INFORMATION — S208

ACQUIRE SCHEDULE INFORMATION — S209

DETERMINE COEFFICIENT BASED ON ACQUIRED SCHEDULE INFORMATION — S210

ACQUIRE CLIMATE INFORMATION — S211

DETERMINE COEFFICIENT BASED ON ACQUIRED CLIMATE INFORMATION — S212

CALCULATE DEMAND FOR ELECTRICAL ENERGY — S213

STORE DEMAND FOR ELECTRICAL ENERGY IN MEMORY — S214

END

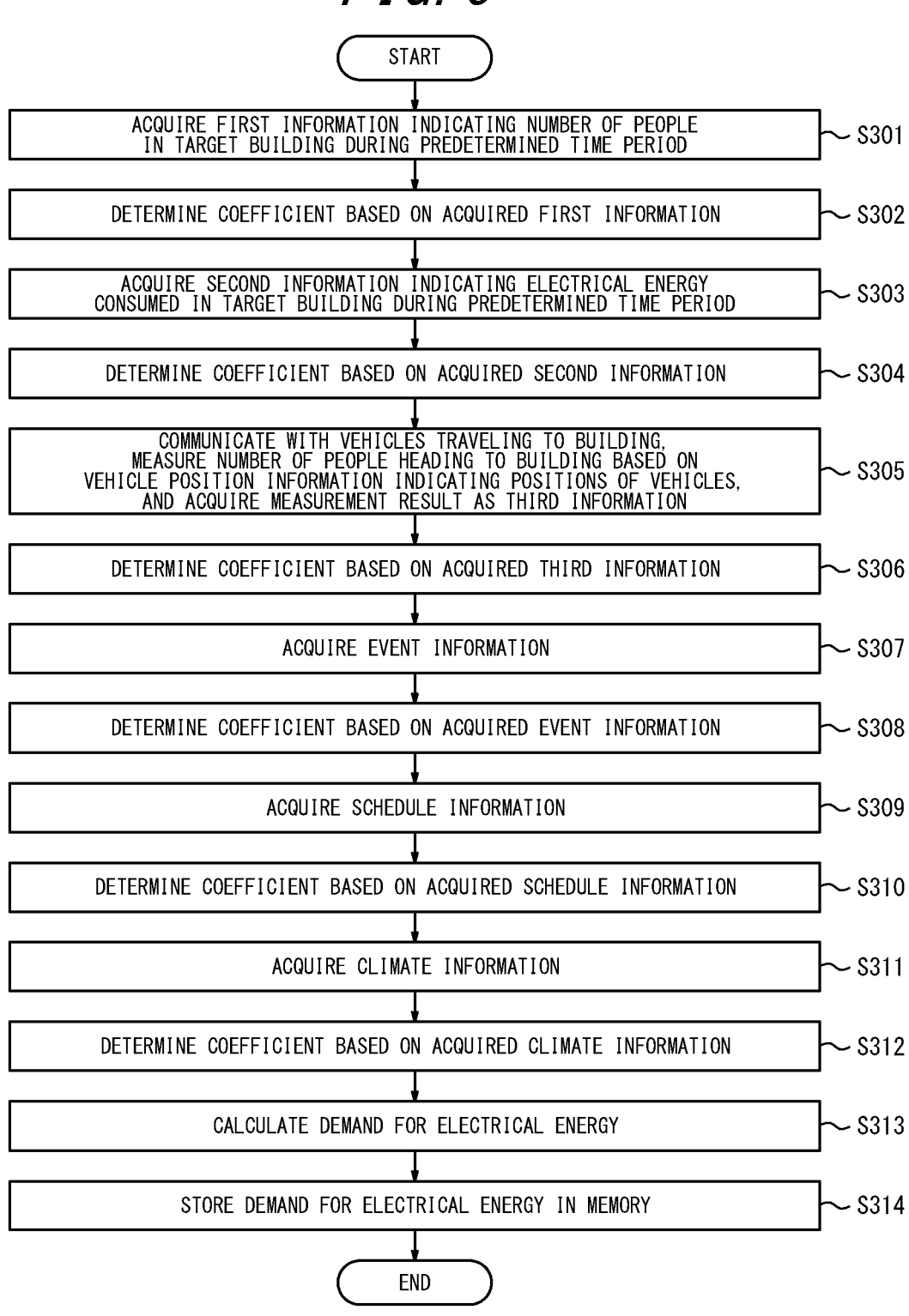

START

ACQUIRE FIRST INFORMATION INDICATING NUMBER OF PEOPLE IN TARGET BUILDING DURING PREDETERMINED TIME PERIOD — S301

DETERMINE COEFFICIENT BASED ON ACQUIRED FIRST INFORMATION — S302

ACQUIRE SECOND INFORMATION INDICATING ELECTRICAL ENERGY CONSUMED IN TARGET BUILDING DURING PREDETERMINED TIME PERIOD — S303

DETERMINE COEFFICIENT BASED ON ACQUIRED SECOND INFORMATION — S304

COMMUNICATE WITH VEHICLES TRAVELING TO BUILDING, MEASURE NUMBER OF PEOPLE HEADING TO BUILDING BASED ON VEHICLE POSITION INFORMATION INDICATING POSITIONS OF VEHICLES, AND ACQUIRE MEASUREMENT RESULT AS THIRD INFORMATION — S305

DETERMINE COEFFICIENT BASED ON ACQUIRED THIRD INFORMATION — S306

ACQUIRE EVENT INFORMATION — S307

DETERMINE COEFFICIENT BASED ON ACQUIRED EVENT INFORMATION — S308

ACQUIRE SCHEDULE INFORMATION — S309

DETERMINE COEFFICIENT BASED ON ACQUIRED SCHEDULE INFORMATION — S310

ACQUIRE CLIMATE INFORMATION — S311

DETERMINE COEFFICIENT BASED ON ACQUIRED CLIMATE INFORMATION — S312

CALCULATE DEMAND FOR ELECTRICAL ENERGY — S313

STORE DEMAND FOR ELECTRICAL ENERGY IN MEMORY — S314

END

*FIG. 7*

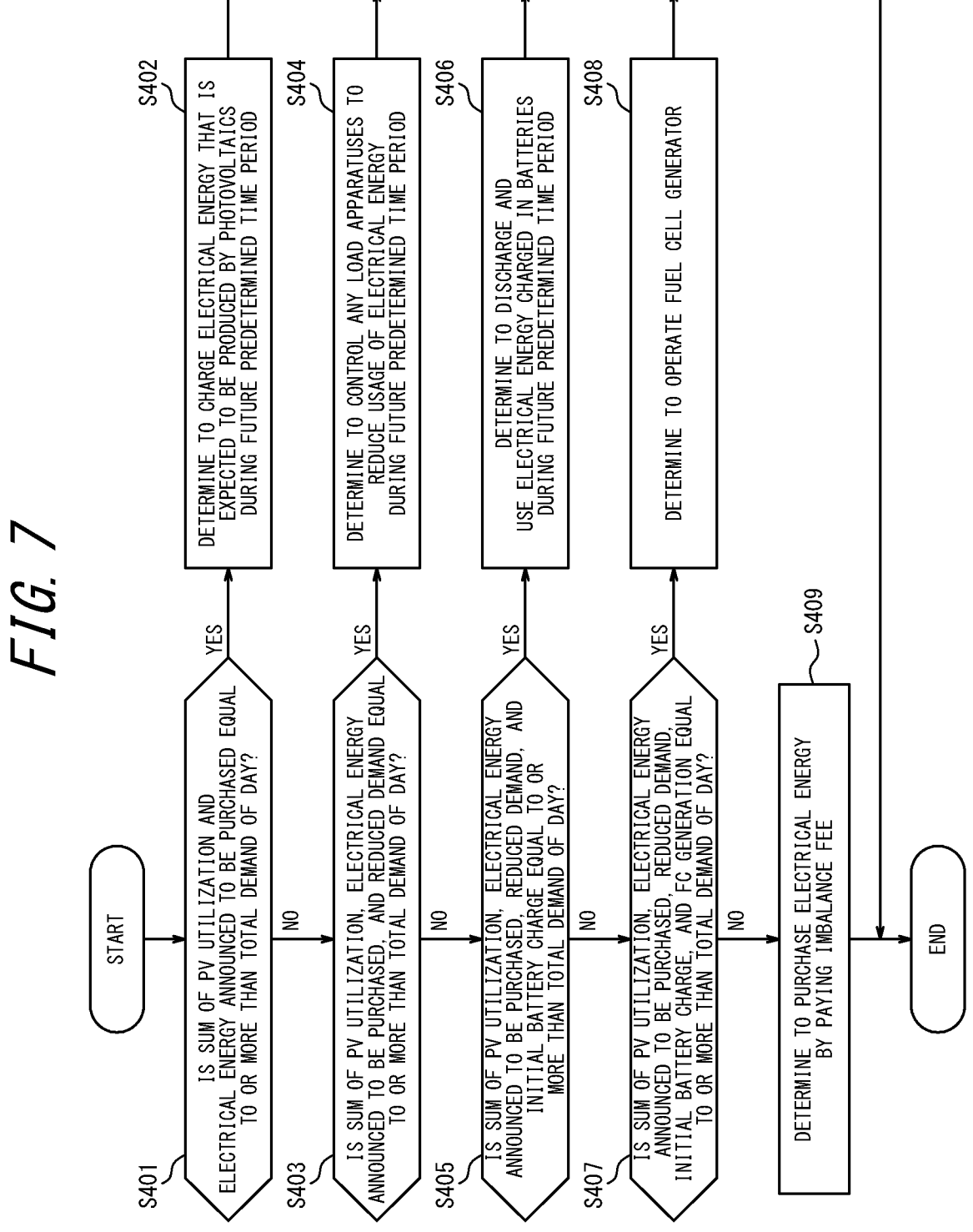

START

S401 — IS SUM OF PV UTILIZATION AND ELECTRICAL ENERGY ANNOUNCED TO BE PURCHASED EQUAL TO OR MORE THAN TOTAL DEMAND OF DAY?

YES → S402 — DETERMINE TO CHARGE ELECTRICAL ENERGY THAT IS EXPECTED TO BE PRODUCED BY PHOTOVOLTAICS DURING FUTURE PREDETERMINED TIME PERIOD

NO ↓

S403 — IS SUM OF PV UTILIZATION, ELECTRICAL ENERGY ANNOUNCED TO BE PURCHASED, AND REDUCED DEMAND EQUAL TO OR MORE THAN TOTAL DEMAND OF DAY?

YES → S404 — DETERMINE TO CONTROL ANY LOAD APPARATUSES TO REDUCE USAGE OF ELECTRICAL ENERGY DURING FUTURE PREDETERMINED TIME PERIOD

NO ↓

S405 — IS SUM OF PV UTILIZATION, ELECTRICAL ENERGY ANNOUNCED TO BE PURCHASED, REDUCED DEMAND, AND INITIAL BATTERY CHARGE EQUAL TO OR MORE THAN TOTAL DEMAND OF DAY?

YES → S406 — DETERMINE TO DISCHARGE AND USE ELECTRICAL ENERGY CHARGED IN BATTERIES DURING FUTURE PREDETERMINED TIME PERIOD

NO ↓

S407 — IS SUM OF PV UTILIZATION, ELECTRICAL ENERGY ANNOUNCED TO BE PURCHASED, REDUCED DEMAND, INITIAL BATTERY CHARGE, AND FC GENERATION EQUAL TO OR MORE THAN TOTAL DEMAND OF DAY?

YES → S408 — DETERMINE TO OPERATE FUEL CELL GENERATOR

NO ↓

S409 — DETERMINE TO PURCHASE ELECTRICAL ENERGY BY PAYING IMBALANCE FEE

END

CONTROL APPARATUS, CONTROL METHOD, AND NON-TRANSITORY COMPUTER READABLE MEDIUM FOR OCCUPANT-BASED ENERGY PREDICTION

CROSS-REFERENCE TO RELATED APPLICATION

This application claims priority to Japanese Patent Application No. 2022-002632 filed on Jan. 11, 2022, the entire contents of which are incorporated herein by reference.

TECHNICAL FIELD

The present disclosure relates to a control apparatus, a control method, and a program.

BACKGROUND

Technology for promoting leveling of electrical energy loads of equipment in buildings by taking into account the presence of people in the buildings is known. For example, Patent Literature (PTL) 1 discloses collecting operating status of electrical equipment to determine occupants' presence, predicting the time of presence on a dwelling-by-dwelling basis from the determined presence information, and allocating water heaters' usage time periods based on the predicted time.

CITATION LIST

Patent Literature

PTL 1: JP 2016-075453 A

SUMMARY

There is room for improvement with respect to technology for predicting demands for electrical energy by taking into account flows of people into buildings.

It would be helpful to improve technology for predicting demands for electrical energy by taking into account flows of people into buildings.

A control apparatus according to an embodiment of the present disclosure includes a controller configured to:

acquire first information indicating the number of people in a target building during a predetermined time period, second information indicating electrical energy consumed in the target building during the predetermined time period, and/or third information indicating the number of people heading to the target building during the predetermined time period; and estimate, based on the first information, the second information, or the third information, a demand for electrical energy for the building during a future target time period.

A control method according to an embodiment of the present disclosure is a control method performed by a computer, the control method including:

acquiring first information indicating the number of people in a target building during a predetermined time period, second information indicating electrical energy consumed in the target building during the predetermined time period, and/or third information indicating the number of people heading to the target building during the predetermined time period; and estimating, based on the first information, the second information, or the third information, a demand for electrical energy for the building during a future target time period.

A program according to an embodiment of the present disclosure is configured to cause a computer to execute operations, the operations including:

acquiring first information indicating the number of people in a target building during a predetermined time period, second information indicating electrical energy consumed in the target building during the predetermined time period, and/or third information indicating the number of people heading to the target building during the predetermined time period; and estimating, based on the first information, the second information, or the third information, a demand for electrical energy for the building during a future target time period.

According to an embodiment of the present disclosure, technology for predicting demands for electrical energy by taking into account flows of people into buildings is improved.

BRIEF DESCRIPTION OF THE DRAWINGS

In the accompanying drawings:

FIG. 1 is a diagram illustrating a configuration of a system according to a first embodiment of the present disclosure;

FIG. 3 is a diagram illustrating a configuration of a system according to a second embodiment of the present disclosure;

FIG. 4 is a flowchart illustrating operations of a control apparatus according to the second embodiment of the present disclosure;

FIG. 5 is a diagram illustrating a configuration of a system according to a third embodiment of the present disclosure;

FIG. 6 is a flowchart illustrating operations of a control apparatus according to the third embodiment of the present disclosure; and FIG. 7 is a flowchart illustrating an example of operations of a server that manages a CEMS.

DETAILED DESCRIPTION

First Embodiment

Figure 2:
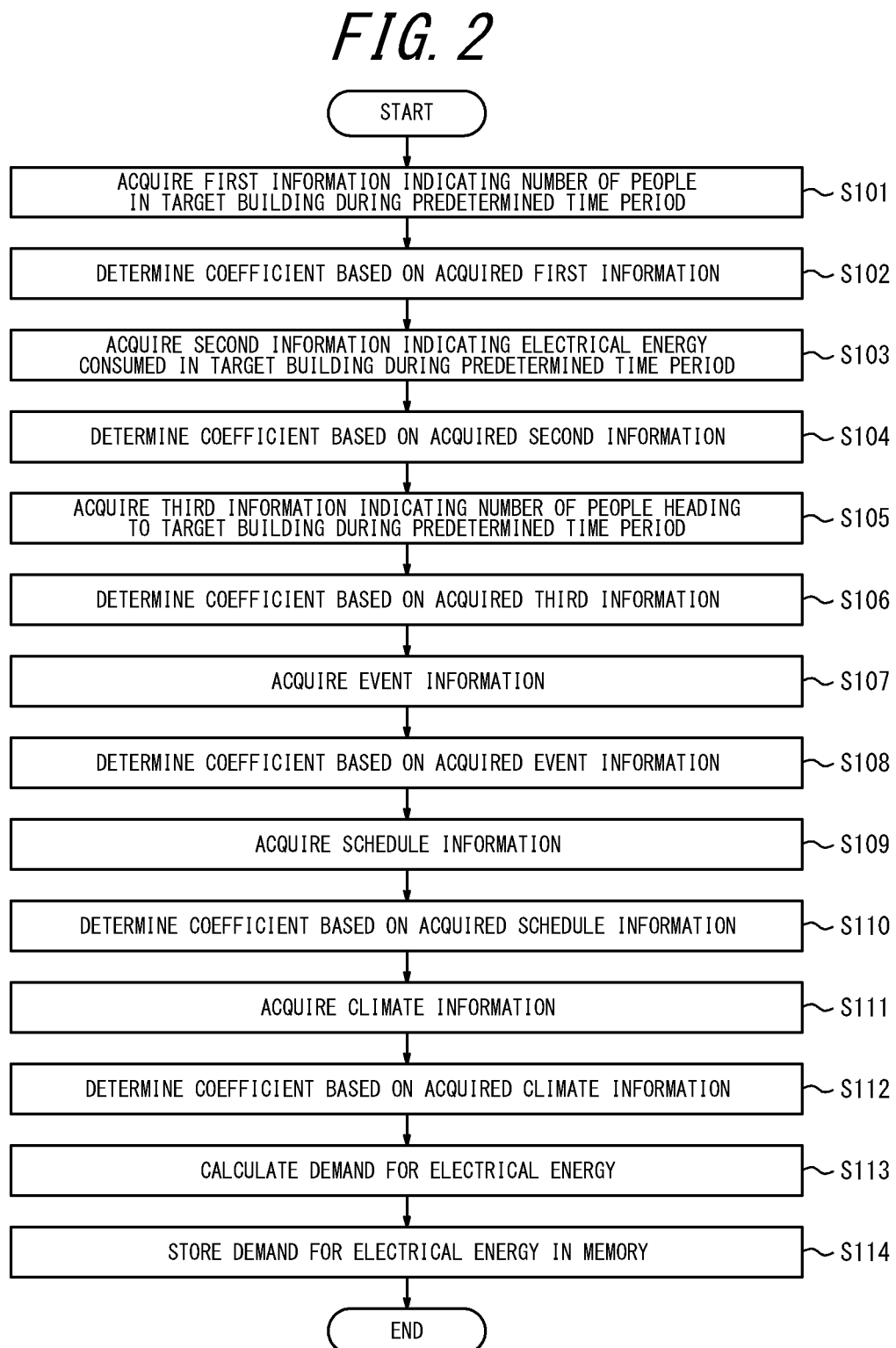
FIG. 2 is a flowchart illustrating operations of a control apparatus according to the first embodiment of the present disclosure.

Hereinafter, an embodiment of the present disclosure will be described.

Figure 1:
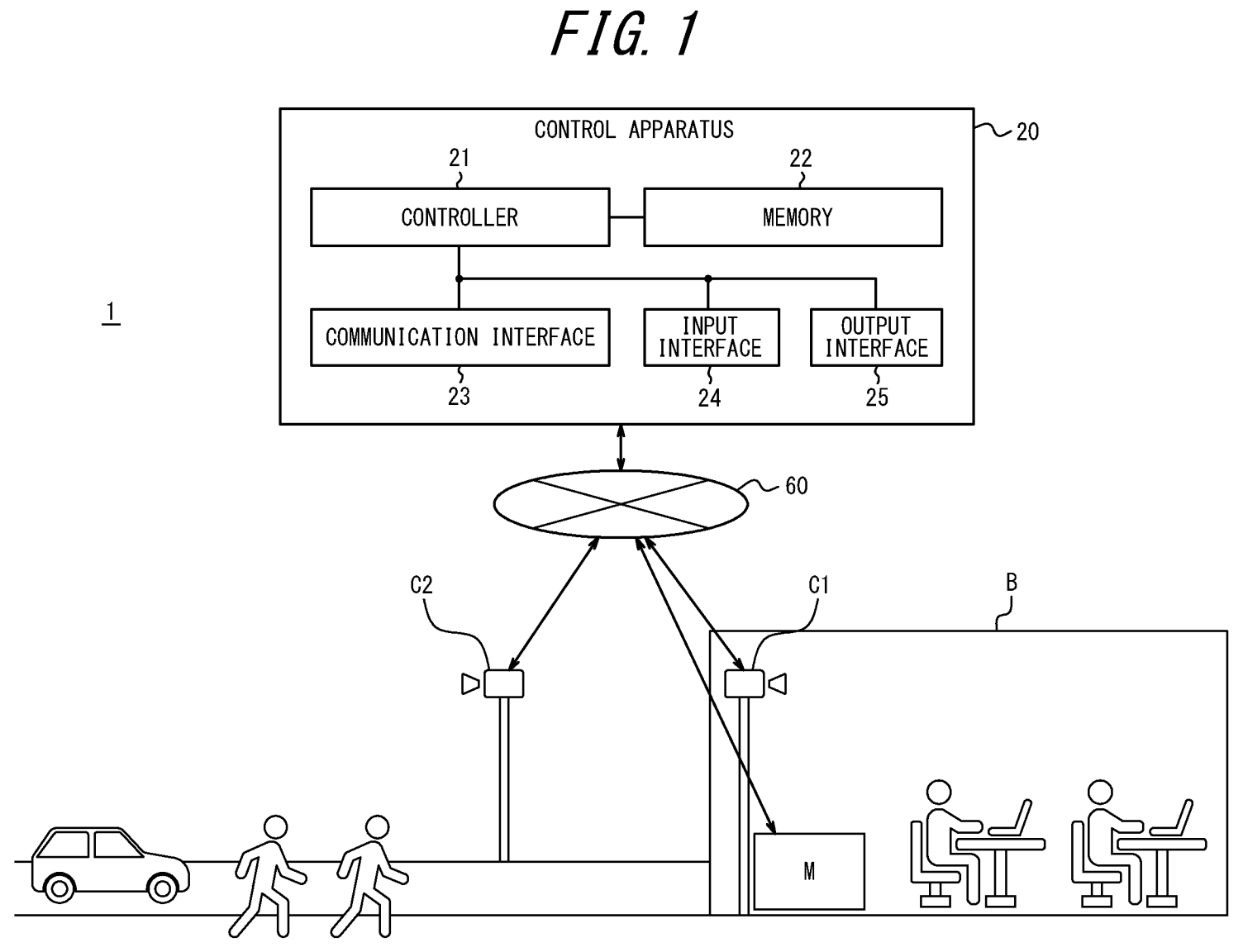

An outline of a system 1 according to the embodiment of the present disclosure will be described with reference to FIG. 1. The system 1 includes a control apparatus 20, a camera C1, a camera C2, and an electrical energy meter M. The control apparatus 20, the camera C1, the camera C2, and the electrical energy meter M are communicably connected to a network 60 that includes, for example, the Internet.

The network 60 includes the Internet, at least one WAN, at least one MAN, or a combination thereof. The term "WAN" is an abbreviation of wide area network. The term "MAN" is an abbreviation of metropolitan area network. The network 60 may include at least one wireless network, at least one optical network, or a combination thereof. The wireless network is, for example, an ad hoc network, a cellular network, a wireless LAN, a satellite communication network, or a terrestrial microwave network. The term "LAN" is an abbreviation of local area network.

The control apparatus 20 is installed in a facility such as a data center. The control apparatus 20 is, for example, a server that belongs to a cloud computing system or another type of computing system.

The camera C1 is installed inside a building B to image people inside the building B. The camera C2 is installed on a road or another location in the vicinity of the building B to image people or vehicles heading to the building B. Not limited to these, the cameras C1 and C2 may be installed at any locations. The cameras C1 and C2 each include a communication interface and can transmit captured images to the control apparatus 20 via the communication interface and the network 60.

The electrical energy meter M is, for example, a smart meter. The electrical energy meter M is installed inside the building B, for example, but not limited to this. The electrical energy meter M can measure electrical energy consumed by any load apparatuses in the building B during a predetermined time period. The electrical energy meter M includes a communication interface and can transmit information indicating the measured consumed electrical energy to the control apparatus 20 via the communication interface and the network 60.

In the present embodiment, the system 1 is used as a Community EMS (CEMS). Among Energy Management Systems (EMSs), which are energy control systems for a part of electrical energy systems, CEMSs, which manage predetermined regions, grasp electrical energy required in the regions, command predetermined facilities to reduce energy consumption, determine electrical energy to be supplied from outside, and the like.

An example of a process flow of control by a server that manages the CEMS will be described with reference to FIG. 7. The server may be the same apparatus as the control apparatus 20 according to the present embodiment, or may be a different apparatus.

First, in step S401, the server determines whether the sum of PV utilization and electrical energy announced to be purchased is equal to or more than a total demand of the day. The PV utilization may include an actual value of photovoltaic electrical energy used in a region at the time of step S401 and electrical energy expected to be produced by photovoltaics in a future time period. The future time period may be a time period in which electrical energy usage in the region reaches its peak, for example, from 2:00 PM to 3:00 PM. Information indicating the PV utilization may be transmitted from any photovoltaic facilities to the server, so that the server can acquire the PV utilization. The electrical energy announced to be purchased is electrical energy that has been determined to be purchased from any electrical energy provider by the time of step S401, for example, the previous day. The total demand of the day includes electrical energy that has been consumed in the region at the time of step S401 and electrical energy that is expected to be demanded in the future time period.

In a case in which the sum of the PV utilization and the electrical energy announced to be purchased is equal to or more than the total demand of the day, the process of the server proceeds to step S402, in which the server determines to charge electrical energy that is expected to be produced by photovoltaics during the future time period. In a case in which the sum of the PV utilization and the electrical energy announced to be purchased is less than the total demand of the day, the process of the server proceeds to step S403.

In step S403, the server determines whether the sum of the PV utilization, the electrical energy announced to be purchased, and a reduced demand is equal to or more than the total demand of the day. The reduced demand is electrical energy the usage of which can be reduced for load apparatuses or the like in the region during the future time period. In a case in which the sum of the PV utilization, the electrical energy announced to be purchased, and the reduced demand is equal to or more than the total demand of the day, the process of the server proceeds to step S404, in which the server determines to control any load apparatuses in the region to reduce the usage of electrical energy during the future time period. In a case in which the sum of the PV utilization, the electrical energy announced to be purchased, and the reduced demand is less than the total demand of the day, the process of the server proceeds to step S405.

In step S405, the server determines whether the sum of the PV utilization, the electrical energy announced to be purchased, the reduced demand, and an initial battery charge is equal to or more than the total demand of the day. The initial battery charge refers to electrical energy charged in batteries of facilities or the like in the region. In a case in which the sum of the PV utilization, the electrical energy announced to be purchased, the reduced demand, and the initial battery charge is equal to or more than the total demand of the day, the process of the server proceeds to step S406, in which the server determines to discharge and use the electrical energy charged in the batteries during the predetermined time period. In a case in which the sum of the PV utilization, the electrical energy announced to be purchased, the reduced demand, and the initial battery charge is less than the total demand of the day, the process of the server proceeds to step S407.

In step S407, the server determines whether the sum of the PV utilization, the electrical energy announced to be purchased, the reduced demand, the initial battery charge, and an FC generation is equal to or more than the total demand for the day. The FC generation refers to electrical energy that can be produced by operating a fuel cell generator. In a case in which the sum of the PV utilization, the electrical energy announced to be purchased, the reduced demand, the initial battery charge, and the FC generation is equal to or more than the total demand of the day, the process of the server proceeds to step S408, in which the server determines to operate the fuel cell generator. In a case in which the sum of the PV utilization, the electrical energy announced to be purchased, the reduced demand, the initial battery charge, and the FC generation is less than the total demand of the day, the process of the server proceeds to step S409, in which the server determines to purchase electrical energy by paying an imbalance fee, for example. Thereafter, the process by the server ends.

In this way, the server controls over a case in which available electrical energy is insufficient for the total demand of the day. This enables flexible energy management in the CEMS. Of the total demand of the day described above, a part of electrical energy that is expected to be demanded in the future time period is a demand for electrical energy for a building in a future target time period according to the present embodiment. According to the present embodiment, a demand for electrical energy for each building in the region is estimated with high accuracy, thereby improving accuracy in prediction of the total demand of the day and facilitating control of the CEMS.

First, an outline of the present embodiment will be described, and details thereof will be described later. The control apparatus 20 acquires first information indicating the number of people in the target building B during a predetermined time period, second information indicating electrical energy consumed in the target building B during the predetermined time period, and/or third information indicating the number of people heading to the target building B during the predetermined time period, and estimates, based on the first information, second information, or third information, a demand for electrical energy for the building B during a future target time period.

The target building B is an office building that contains a business office in the present embodiment, and the number of people in the building B refers to the number of people who come to work in the office building. Not limited to this, the building B may be a school, event venue, commercial facility, hospital, or other public facilities. In this case, the number of people in the building B is the number of people who come to the building B and spend a certain period of time there, and may include the number of students and teachers in a school, the number of event organizers and participants in an event venue, the number of clerks and customers in a commercial facility, and the number of doctors and patients in a hospital.

The predetermined time period is a morning hour in the present embodiment, more specifically a time period from 9:00 AM to 10:00 AM. The time period is an hour after the time at which the people who have arrived at work in the building B start working. Not limited to this, the predetermined time period may be set arbitrarily. This allows, for example, in a case in which the predetermined time period is a morning hour, estimating a demand for electrical energy for the building B at the time of morning.

The electrical energy consumed in the target building B includes electrical energy consumed by at least one of load apparatuses installed in the target building B. In the present embodiment, the electrical energy consumed in the target building B is the sum of electrical energy consumed by the respective load apparatuses. The load apparatuses include lighting fixtures, heating and cooling apparatuses, transport apparatuses such as elevators and escalators, office equipment such as personal computers and copiers in the building B. In the present embodiment, the electrical energy consumed in the target building B is measured by the electrical energy meter M.

The demand for electrical energy refers to electrical energy required in the building B, and in the present embodiment, refers to electrical energy that is expected to be consumed by the load apparatuses installed in the building B. The future target time period is daytime in the present embodiment, and more specifically, a time period from 1:00 PM to 2:00 PM. This is a time period in which the demand for electrical energy for the entire building B is at its peak. Not limited to this, the future target time period may be set arbitrarily.

Thus, according to the present embodiment, the number of people who are already in the building B and the number of people who are heading to the building B can be grasped, and thereby the number of people who are to be present in the building B in the future target time period can be accurately predicted. Based on such number of people and the electrical energy consumed in the building B, the demand for electrical energy for the building during the future target time period can be estimated with higher accuracy. Therefore, technology for predicting demands for electrical energy by taking into account flows of people into buildings can be improved.

Next, configurations of the system 1 will be described in detail.

As illustrated in FIG. 1, the control apparatus 20 includes a controller 21, a memory 22, a communication interface 23, an input interface 24, and an output interface 25.

The controller 21 includes at least one processor, at least one programmable circuit, at least one dedicated circuit, or a combination of these. The processor is a general purpose processor such as a CPU or a GPU, or a dedicated processor that is dedicated to specific processing, but is not limited to these. The dedicated circuit is an ASIC, for example, but is not limited to this. The controller 21 controls the operations of the entire control apparatus 20.

The memory 22 includes one or more memories. The memories included in the memory 22 may each function as, for example, a main memory, an auxiliary memory, or a cache memory. The memory 22 stores any information used for operations of the control apparatus 20. For example, the memory 22 may store a system program, an application program, a database, map information, and the like. The information stored in the memory 22 may be updated with, for example, information acquired from the network 60 via the communication interface 23.

The communication interface 23 includes at least one interface for communication for connecting to the network 60. The interface for communication is compliant with, for example, mobile communication standards, wired local area network (LAN) standards, or wireless LAN standards, but is not limited to these, and may be compliant with any communication standards.

The input interface 24 includes at least one interface for input. The interface for input is, for example, a physical key, a capacitive key, a pointing device, a touch screen integrally provided with a display, or a microphone. The input interface 24 accepts an operation for inputting data to be used for the operations of the control apparatus 20. The input interface 24, instead of being included in the control apparatus 20, may be connected to the control apparatus 20 as an external input device. As the connection method, any technology such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 25 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescence. The output interface 25 outputs data obtained by the operations of the control apparatus 20. The output interface 25, instead of being included in the control apparatus 20, may be connected to the control apparatus 20 as an external output device. As the connection method, any technology such as USB, HDMI®, or Bluetooth® can be used.

The functions of the control apparatus 20 are realized by execution of a control program according to the present embodiment by a processor corresponding to the controller 21. That is, the functions of the control apparatus 20 are realized by software. The control program causes a computer to execute the operations of the control apparatus 20, thereby causing the computer to function as the control apparatus 20. That is, the computer executes the operations of the control apparatus 20 in accordance with the control program to thereby function as the control apparatus 20.

The program can be stored on a non-transitory computer readable medium. Examples of the non-transitory computer readable medium include a magnetic recording device, an optical disk, a magneto-optical storage device, and ROM. The program is distributed by sale, transfer of ownership, or rental of a portable medium, such as a DVD or a CD-ROM, in which the program is stored. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 20 may be realized by a dedicated circuit corresponding to the controller 21. That is, some or all of the functions of the control apparatus 20 may be realized by hardware.

Operations of the control apparatus 20 according to the present embodiment will be described with reference to FIG. 2. These operations correspond to a control method according to the present embodiment. In the following, the control apparatus 20 transmits and receives information to and from external apparatuses via the communication interface 23 and the network 60. Coefficients calculated below may be generated by any machine learning.

In step S101, the controller 21 of the control apparatus 20 acquires first information indicating the number of people in the target building B during a predetermined time period.

In the present embodiment, the predetermined time period is a morning hour, which is around 9:00 AM, the start of a workday at the business office as the building B. The target building B may be set arbitrarily, and, for example, a user of the control apparatus 20 may set all buildings in the predetermined region as target buildings B via the input interface 24.

Any appropriate method may be used to acquire the first information. In the present embodiment, the controller 21 acquires the first information by analyzing images of the camera C1 installed in the target building B using any image analysis technology. For example, the controller 21 analyzes the images captured by the camera C1 installed in each room in the building B to determine the number of people in each room, and sums up the numbers of people to generate the first information, as the number of people in the building B. The installation position of the camera C1 is not limited to inside the room, but may be near a transport apparatus such as an elevator or escalator, or near a facility in which people move, such as stairs.

Not limited to this, the controller 21 may acquire passage information indicating a record of passage through an entrance gate of the building B, measure the number of people in the building B based on the passage information, and acquire a measurement result as the first information. The entrance gate is an apparatus that manages permission for or prohibition against an entry a person into the building B, and an exit from the building B. The entrance gate, for example, is provided with a contactless or contact-type IC card reader, a door for allowing the person to enter or exit, a controller for controlling each component, and a communication interface. When a person passing through the entrance gate holds an IC card over the reader or performs some other action, the controller at the entrance gate reads an identification number recorded on the IC card, and performs authentication. Upon determining permission for passage as a result of the authentication, the controller opens the door to permit the person to pass through. The controller can transmit such a result of permission for passage through the entrance gate to the control apparatus 20 via the communication interface, as the passage information. The passage information may include, for example, the identification number of the person who has been permitted to pass through and a date and time of the passage. The controller 21 of the control apparatus 20 receives and acquires the passage information via the communication interface 23. The controller 21 may receive the passage information from the entrance gate at all times or periodically. The controller 21 measures the number of people in the building B based on the received passage information. For example, the controller 21 measures the number of people in the building B by subtracting the total number of people who have been permitted to exit the building B from the total number of people who have been permitted to enter the building B by the predetermined time period. The controller 21 acquires such a result of measurement as the first information.

Not limited to this, any method may be employed to acquire the information indicating the record of passage. For example, the controller 21 may receive and acquire the information indicating the record of passage from an external apparatus such as a server apparatus installed in a security management room of the building B. In a case in which the building B consists of multiple buildings, such as a school, the entrance gate may be common to the multiple buildings and be located in one place, or may be provided for each of the multiple buildings. In this case, the controller 21 may acquire the passage information from each entrance gate and sum up the numbers of people that the individual entrance gates have permitted to pass through, to acquire the first information.

Not limited to this, the controller 21 may determine whether each one of people working in the building B is telecommuting, count the number of telecommuting people as the number of telecommuters in a case in which one or more of the people are determined as telecommuters, and subtract the counted total number from a predetermined number to acquire the first information. The predetermined number may be the number of people in a case in which all of the people working in the building B are present in the office. The controller 21 may determine from attendance information described below that a person working in the building B is telecommuting. The controller 21 may communicate with a terminal apparatus held by the person working in the building B and determine that the person is working at home in a case in which the position of the terminal apparatus is at a predetermined location, such as a home of the person working in the building B, registered in advance, for a predetermined time or longer.

Not limited to this, the controller 21 may acquire the attendance information indicating attendance status of the people working in the building B, measure the number of people in the building B based on the attendance information, and acquire a measurement result as the first information. The attendance information includes arrival and departure dates and times of each one of the people working in the building B. Not limited to this, the attendance information may include telecommuting schedules, departments, locations for working such as rooms in the building B, or the like of the people working in the building B. The attendance information may be generated, for example, by inputs of arrival and departure into an external attendance management apparatus when each one of the people working in the building B arrives at or departs from the office. The Inputs into the attendance management apparatus may be made via terminal apparatuses held by the people working in the building B. Not limited to this, the attendance information may be pre-registered.

The control apparatus 20 communicates with the external attendance management apparatus and can receive and acquire the attendance information from the attendance management apparatus. Not limited to this, the control apparatus 20 and the attendance management apparatus may be the same apparatus. The controller 21 measures the number of people in the building B based on the acquired attendance information. For example, the controller 21 measures the number of people in the building B by calculating the total number of people who are present in the office in the building B during the predetermined time period. The controller 21 acquires such a result of measurement as the first information.

In step S102, the controller 21 determines a coefficient based on the acquired first information. The controller 21 may determine the coefficient with a higher value, the greater the number of people in the building B. The coefficient determined in the present embodiment is A1.

In step S103, the controller 21 acquires second information indicating electrical energy consumed in the target building B during the predetermined time period.

Any appropriate method may be used to acquire the second information. In the present embodiment, the controller 21 acquires the second information by receiving, from the electrical energy meter M, information indicating electrical energy consumed by any load apparatuses in the building. The load apparatuses include, for example, heating and cooling apparatuses. The controller 21 may generate the second information by summing the electrical energy consumed by the individual multiple load apparatuses in the building B, measured by the electrical energy meter M, as the electrical energy consumed in the target building B.

In step S104, the controller 21 determines a coefficient based on the acquired second information. The controller 21 may determine the coefficient of a higher value, the greater the value of the electrical energy consumed in the target building. The coefficient determined in the present embodiment is A2.

In step S105, the controller 21 acquires third information indicating the number of people heading to the target building B during the predetermined time period.

Any appropriate method may be used to acquire the third information. In the present embodiment, the controller 21 acquires the third information by analyzing images of the camera C2 installed on the road and the like in the vicinity of the target building B using any image analysis technology. For example, the controller 21 determines the number of people heading to the target building B by analyzing each of the images captured by the camera C2 provided along the road leading to the building B, and sums such numbers of people to generate the third information, as the number of people heading to the target building B. In a case in which the images captured by the camera C2 include a vehicle such as a bus, the controller 21 may determine the number of people in the vehicle by analyzing the images, to generate the third information.

In step S106, the controller 21 determines a coefficient based on the acquired third information. The controller 21 may determine the coefficient with a higher value, the greater the number of people heading to the building B. The coefficient determined in the present embodiment is A3.

In step S107, the controller 21 acquires event information indicating an event to be held in the building B at a future target time period. The event includes an exhibition, presentation, all building closure, and the like to be held in the building B. Any appropriate method may be used to acquire the event information. The controller 21 may read out and acquire the event information stored in the memory 22.

In step S108, the controller 21 determines a coefficient based on the acquired event information. The coefficient may be larger, the greater the number of people who are expected to come to the target building B for the event. The controller 21 may determine such a coefficient based on information indicating the number of people who visited the building B when the same event was held in the past. The coefficient determined in the present embodiment is A4.

In step S109, the controller 21 acquires schedule information indicating a schedule set for the day of the week or time corresponding to the future target time period in the building B. The schedule includes a timetable scheduled on the same day of the week or at the same time of each day in the building B, and includes, for example, starting and finishing times of work established as standards, the day of the week on which it is recommended to leave the office at the standard finishing time, starting and finishing times of lunch breaks, and the like. Any appropriate method may be used to acquire the schedule information. The controller 21 may read out and acquire the schedule information stored in the memory 22.

In step S110, the controller 21 determines a coefficient based on the acquired schedule information. The coefficient may be larger, the greater the number of people assumed to be in the target building B on the day and time. For example, suppose that in the target building B, the day of the week on which it is recommended to leave the office at the standard finishing time of work is Wednesday, and the set future target time period is after the standard finishing time of work on Wednesday. In this case, the coefficient may be lower than that set for the same time period on other days of the week, or for a time period after the standard starting time of work but before the standard finishing time of work on Wednesday. The coefficient determined in the present embodiment is A5.

In step S111, the controller 21 acquires climate information indicating a climate at a location in which the building B is present. The climate includes temperature, humidity, precipitation, wind, and the like at the location in which the building B is present. Any appropriate method may be used to acquire the climate information. For example, the controller 21 may communicate with a thermo-hygrometer installed in the building B and receive values measured by the thermo-hygrometer to acquire the climate information. For example, the controller 21 may communicate with an external apparatus, such as a server in a weather observation center, and acquire the climate information from the external apparatus.

In step S112, the controller 21 determines a coefficient based on the acquired climate information. The coefficient may be larger, the greater the amount of operations of the load apparatuses installed in the target building B, which is assumed in the climate. For example, the larger the temperature indicated by the climate information is different from a reference temperature, the higher the amount of operations of the heating and cooling apparatuses, so a larger coefficient may be determined. The reference temperature is a temperature at which people in the building can stay without operating the heating and cooling apparatuses, for example, 25 degrees Celsius. The reference temperature may be set arbitrarily. The coefficient determined in the present embodiment is A6.

In step S113, the controller 21 calculates a demand for electrical energy by a predetermined function. In the present embodiment, the controller 21 multiplies the coefficients A1 to A6 acquired in steps S102 to S112 by predetermined values to calculate the demand for electrical energy. Not limited to this, any function may be employed to calculate the demand for electrical energy. For example, the controller 21 may sum resulting values by multiplying each of the above coefficients A1 to A6 by the predetermined value and calculate the sum as the demand for electrical energy. For example, the controller 21 may calculate the demand for electrical energy by setting the predetermined values to larger values, the larger the difference between the number of people in the target building indicated by the first information and the number of people heading to the target building indicated by the third information. The function used to calculate the demand for electrical energy may be calculated by machine learning. In this case, the controller 21 may perform machine learning using, as teacher data, actual measurement values of electrical energy that was actually used in the past during the time period in which demand for electrical energy is to be predicted.

In step S114, the controller 21 stores the calculated demand for electrical energy in the memory 22. The controller 21 may store the demand for electrical energy in association with each building B. This allows the controller 21 to sum demands for electrical energy for any buildings B present in the predetermined region. Thereafter, the process by the controller 21 ends.

The controller 21 transmits information indicating the demand for electrical energy to the server managing the CEMS, so the demand for electrical energy calculated in the present embodiment is used as a part or all of the total demand of the day for electrical energy in steps S401, S403, S405, and S407 in FIG. 7. The controller 21 may be able to notify the user via the output interface 25 of the demand for electrical energy calculated for the target building B specified by the user.

As described above, the control apparatus 20 according to the present embodiment includes the controller 21 that acquires the first information indicating the number of people in the target building B during the predetermined time period, the second information indicating electrical energy consumed in the target building B during the predetermined time period, and/or the third information indicating the number of people heading to the target building B during the predetermined time period, and that estimates, based on the first information, second information, or third information, the demand for electrical energy for the building B during the future target time period.

According to the present embodiment, the number of people who are already present in the building B and the number of people who are heading to the building B can be grasped, so that the number of people who are supposed to be in the building B during the future target time period can be accurately predicted. Since the amount of operations of the load apparatuses is expected to increase in the future according to the number of people, the demand for electrical energy for the building B during the future target time period can be estimated with higher accuracy based on the number of people and the electrical energy consumed in the building B. Therefore, technology for predicting demands for electrical energy by taking into account flows of people into buildings can be improved.

As described above, in the control apparatus 20, the controller 21 acquires the passage information indicating the record of passage through the entrance gate of the building B, measures the number of people in the building B based on the passage information, and acquires the measurement result as the first information.

According to the present embodiment, the controller 21 can measure the number of people entering or exiting the building B in real time. The controller 21 can predict that the greater the measured number of people in the building B, the greater the amount of operations of the load apparatuses, which can be reflected in prediction on the demand for electrical energy. In addition, the controller 21 can record, at the same past time, the number of people who were present in the building B and the predicted demand for electrical energy in association with each other, and therefore can improve accuracy in prediction on the demand for electrical energy based on the record. Therefore, technology for predicting demands for electrical energy by taking into account flows of people into buildings can be improved.

As described above, the control apparatus 20 further includes the communication interface 23. The controller 21 communicates with the camera C1 installed in the building B via the communication interface 23, measures the number of people in the building B based on the images captured by the camera C1, and acquires the measurement result as the first information.

Accurately measuring, using the camera C1, the number of people in the building B allows predicting the amount of operations of the load apparatuses. The controller 21 can record, at the same past time, the number of people who were present in the building B and the predicted demand for electrical energy in association with each other, and therefore can improve accuracy in prediction on the demand for electrical energy based on the record. Therefore, technology for predicting demands for electrical energy by taking into account flows of people into buildings can be improved.

As described above, in the control apparatus 20, the controller 21 communicates with the camera C2 installed on the road leading to the building B via the communication interface 23, measures the number of people heading to the building B based on the images captured by the camera C2, and acquires the measurement result as the third information.

The number of people heading to the building B can be predicted more accurately and efficiently by analyzing the images of the camera C2. In a case in which the number of people heading to the building B is high, the number of people in the building B during the future target time period is supposed to be high, and the demand for electrical energy for the building B is expected to increase. Therefore, technology for predicting demands for electrical energy by taking into account flows of people into buildings can be improved.

As described above, in the control apparatus 20, the controller 21 measures the number of people in the building B based on whether the people working in the building B are telecommuting, and acquires the measurement result as the first information.

It is expected that people who are predetermined to telecommute are unlikely to come to the building B during the future target time period. Using the number of telecommuters grasped in advance, the demand for electrical energy can be predicted more efficiently. Therefore, technology for predicting demands for electrical energy by taking into account flows of people into buildings can be improved.

As described above, in the control apparatus 20, the controller 21 acquires the attendance information indicating the attendance status of people working in the building B, measures the number of people in the building B based on the attendance information, and acquires the measurement result as the first information.

According to the present embodiment, the controller 21 can grasp the number of people who are present in the building B based on the attendance status, and measure the number of people in the building B with high accuracy. By grasping the attendance status, the number of people who are likely to relate to a change in the operations of the load apparatuses during the future target time period, rather than people who are visiting the building B temporarily, can be measured, which improves accuracy in prediction on the demand for electrical energy. Therefore, technology for predicting demands for electrical energy by taking into account flows of people into buildings can be improved.

As described above, in the control apparatus 20, the controller 21 further acquires the climate information indicating the climate at the location in which the building B is present and estimates the demand for electrical energy based on the climate information.

The further away from the climate in which people are comfortable, the higher the amount of operations of the load apparatuses in the building B is expected, resulting in improved accuracy in prediction on the demand for electrical energy. Therefore, technology for predicting demands for electrical energy by taking into account flows of people into buildings can be improved.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided. For example, an embodiment in which the configuration and operations of the control apparatus 20 in the above embodiment are distributed to multiple computers capable of communicating with each other can be implemented.

Second Embodiment

As a variation of the present disclosure, the controller 21 may communicate with terminal apparatuses 30 held by people traveling to the building B, measure the number of people heading to the building B based on terminal position information indicating positions of the terminal apparatuses 30, and acquire a measurement result as the third information.

FIG. 3 illustrates a schematic configuration of a system 2 according to the present embodiment. As illustrated in FIG. 3, the control apparatus 20 communicates with each terminal apparatus 30, instead of the camera C2 in the first embodiment, via the network 60.

The terminal apparatus 30 is held by a person traveling to the building B as described below. The terminal apparatus 30 is, for example, a mobile device such as a mobile phone, a smartphone, a wearable device, or a tablet, or a PC. The term "PC" is an abbreviation of personal computer. The "wearable device" is specifically a mobile device that is wearable on a human body, such as a wristwatch-type device or an anklet-type device.

The description of the control apparatus 20, camera C1, and electrical energy meter M is the same as in the first embodiment and is therefore omitted.

A configuration of the terminal apparatus 30 according to the present embodiment will be described with reference to FIG. 3.

The terminal apparatus 30 includes a controller 31, a memory 32, a communication interface 33, an input interface 34, an output interface 35, and a positioner 36.

The controller 31 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 31 executes processes related to operations of the terminal apparatus 30 while controlling components of the terminal apparatus 30.

The memory 32 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores information to be used for the operations of the terminal apparatus 30 and information obtained by the operations of the terminal apparatus 30.

The communication interface 33 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The term "LTE" is an abbreviation of Long Term Evolution. The term "4G" is an abbreviation of 4th generation. The term "5G" is an abbreviation of 5th generation. The communication interface 33 receives information to be used for the operations of the terminal apparatus 30, and transmits information obtained by the operations of the terminal apparatus 30.

The input interface 34 includes at least one interface for input. The interface for input is, for example, a physical key, a capacitive key, a pointing device, a touch screen integrally provided with a display, or a microphone. The input interface 34 accepts an operation for inputting information to be used for the operations of the terminal apparatus 30. The input interface 34, instead of being included in the terminal apparatus 30, may be connected to the terminal apparatus 30 as an external input device. As the connection method, any technology such as USB, HDMI®, or Bluetooth® can be used.

The output interface 35 includes at least one interface for output. The interface for output is, for example, a display, a speaker, or a vibration motor. The display is, for example, an LCD or an organic EL display. The output interface 35 outputs information obtained by the operations of the terminal apparatus 30. The output interface 35, instead of being included in the terminal apparatus 30, may be connected to the terminal apparatus 30 as an external output device. As the connection method, any technology such as USB, HDMI®, or Bluetooth® can be used.

The positioner 36 includes at least one GNSS receiver. The term "GNSS" is an abbreviation of global navigation satellite system. GNSS includes, for example, GPS, QZSS, GLONASS, and/or Galileo. The term "GPS" is an abbreviation of Global Positioning System. The term "QZSS" is an abbreviation of Quasi-Zenith Satellite System. QZSS satellites are called quasi-zenith satellites. The term "GLONASS" is an abbreviation of Global Navigation Satellite System. The positioner 36 measures the position of the terminal apparatus 30.

The functions of the terminal apparatus 30 are realized by execution of a terminal program according to the present embodiment by a processor corresponding to the controller 31. That is, the functions of the terminal apparatus 30 are realized by software. The terminal program causes a computer to execute the operations of the terminal apparatus 30, thereby causing the computer to function as the terminal apparatus 30. That is, the computer executes the operations of the terminal apparatus 30 in accordance with the terminal program to thereby function as the terminal apparatus 30.

Some or all of the functions of the terminal apparatus 30 may be realized by a dedicated circuit corresponding to the controller 31. That is, some or all of the functions of the terminal apparatus 30 may be realized by hardware.

Operations of the controller 21 of the control apparatus 20 in the system 2 will be described with reference to FIG. 4. These operations correspond to a control method according to the present embodiment.

Steps S201 through S204 in FIG. 4 are similar to steps S101 through S104 in FIG. 2 according to the first embodiment, and hence a description thereof is omitted.

In step S205, the controller 21 communicates with the terminal apparatuses 30 held by people traveling to the building B, measures the number of people heading to the building B based on terminal position information indicating positions of the terminal apparatuses 30, and acquires a measurement result as the third information.

Specifically, the controller 21 first identifies the terminal apparatuses 30 held by the people heading to the building B and communicates with the terminal apparatuses 30. Any method may be employed to identify the terminal apparatuses 30 held by the people heading to the building B. For example, the controller 21 acquires terminal position information indicating positions of multiple terminal apparatuses within a predetermined range from the building B, and in a case in which the terminal position information indicates that one or more of the terminal apparatuses are traveling to the building B on predetermined roads leading to the building B, the controller 21 may identify the terminal apparatuses as the terminal apparatuses 30 held by people traveling to the building B.

For example, the controller 21 may identify terminal apparatuses whose destinations are set to the target building B in route guidance applications, as the terminal apparatuses 30 held by the people traveling to the building B. Not limited to this, the controller 21 may identify terminal apparatuses 30 held by people registered in advance, such as people working in the building B, as the terminal apparatuses 30 held by the people traveling to the building B.

The controller 21 calculates, from the terminal position information indicating the position of each of the identified terminal apparatuses 30, an estimated arrival time at the building B by calculating a traveling speed and a traveling direction. The controller 21 counts the number of people heading to the building B in a case in which the estimated arrival time is in the future target time period, and acquires a counted total as the third information. In this way, the controller 21 measures the number of people heading to the building B and acquires a measurement result as the third information.

In a case in which the pre-registered terminal apparatuses held by the people working in the building B are identified as the terminal apparatuses 30 held by the people traveling to the building B, the controller 21 may count the people heading to the building B when each of the terminal apparatuses 30 travels along a predetermined route, and acquire a counted total as the third information. The predetermined route may be pre-registered as a commuting route.

Steps S206 through S214 in FIG. 6 are similar to steps S106 through S114 in FIG. 2 according to the first embodiment, and hence a description thereof is omitted.

According to the present embodiment, the controller 21 can more accurately predict how much the number of people present in the building B increases during the future target time period, by communicating with the terminal apparatuses 30 held by the people who are certainly heading to the building B. Therefore, accuracy in prediction on the demand for electrical energy for the building B during the future target time period is improved. Therefore, technology for predicting demands for electrical energy by taking into account flows of people into buildings can be improved.

Third Embodiment

As a variation of the present disclosure, the controller 21 may communicate with vehicles 40 traveling to the building B, measure the number of people heading to the building B based on vehicle position information indicating positions of the vehicles 40, and acquire a measurement result as the third information.

Figure 5:
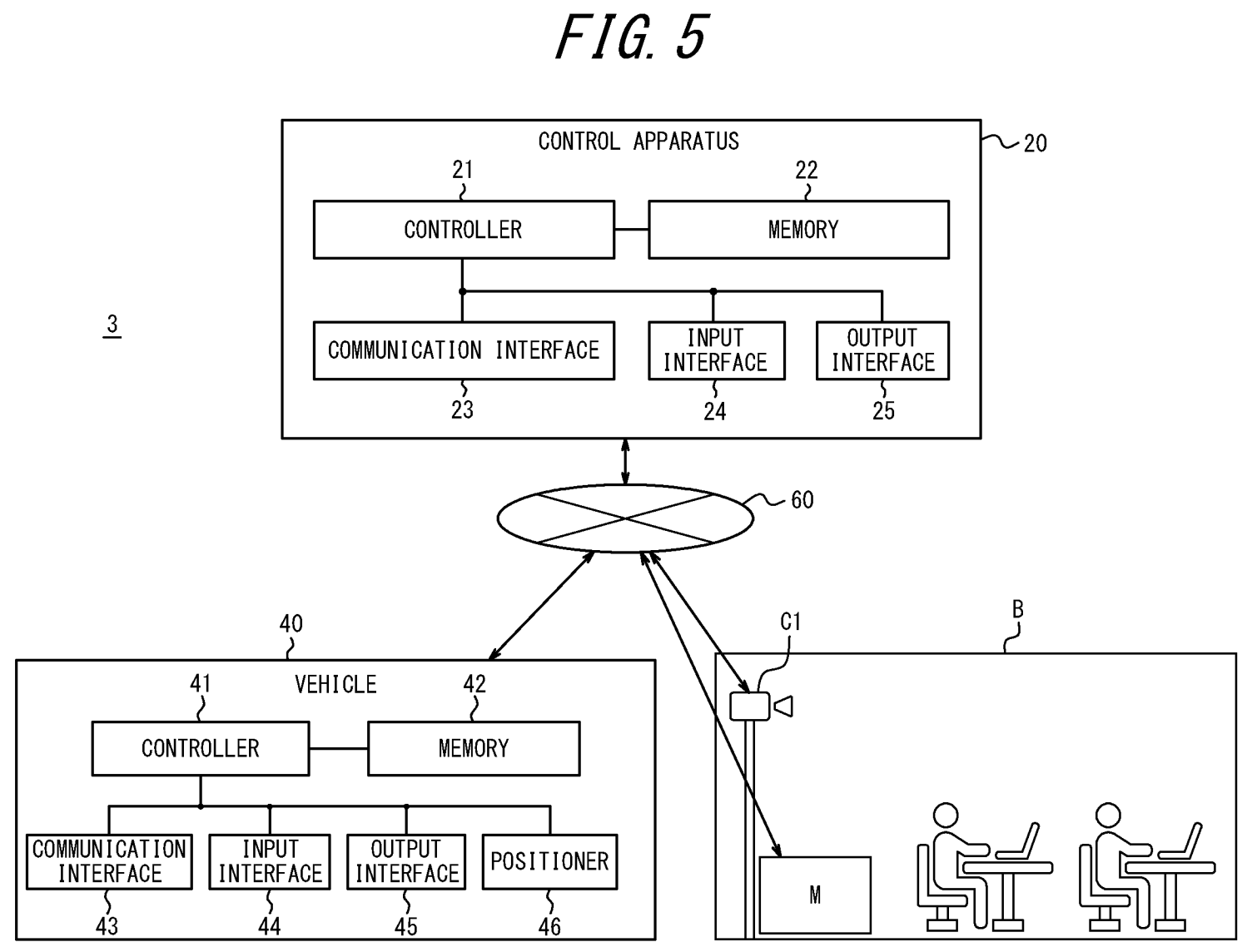

FIG. 5 illustrates a schematic configuration of a system 3 according to the present embodiment. As illustrated in FIG. 5, the control apparatus 20 communicates with each vehicle 40, instead of the camera C2 in the first embodiment, via the network 60.

The vehicle 40 is an automobile, for example, but is not limited to this, and may be any appropriate vehicle. The automobile is, for example, a gasoline vehicle, a Battery Electric Vehicle (BEV), a Hybrid Electric Vehicle (HEV), a Plug-in Hybrid Electric Vehicle (PHEV), a Fuel Cell Electric Vehicle (FCEV), or the like, but is not limited to these. The vehicle 40 may be driven by a driver, or the driving may be automated at any level. The level of automation is, for example, one of level 1 to level 5 according to the classification of the Society of Automotive Engineers (SAE). The vehicle 40 may be a Mobility as a Service (MaaS) dedicated vehicle. The vehicle 40 travels to the building B as described below.

The description of the control apparatus 20, camera C1, and electrical energy meter M is the same as in the first embodiment and is therefore omitted.

A configuration of the vehicle 40 according to the present embodiment will be described with reference to FIG. 5.

The vehicle 40 includes a controller 41, a memory 42, a communication interface 43, an input interface 44, an output interface 45, and a positioner 46. The vehicle 40 further includes various sensors.

The various sensors, the controller 41, the memory 42, the communication interface 43, the input interface 44, the output interface 45, and the positioner 46 may be communicably connected to an in-vehicle network, such as a Controller Area Network (CAN).

The controller 41 includes at least one processor, at least one programmable circuit, at least one dedicated circuit, or a combination of these. The processor is a general purpose processor such as a CPU or a GPU, or a dedicated processor that is dedicated to specific processing, for example, but is not limited to these. The programmable circuit is an FPGA, for example, but is not limited to this. The dedicated circuit is an ASIC, for example, but is not limited to this. The controller 41 may include one or more electronic control units (ECUs). The controller 41 controls operations of the vehicle 40 overall while controlling the various components of the vehicle 40.

The memory 42 includes one or more memories. The memories are semiconductor memories, magnetic memories, optical memories, or the like, for example, but are not limited to these. The memories included in the memory 42 may each function as, for example, a main memory, an auxiliary memory, or a cache memory. The memory 42 stores any information used for operations of the vehicle 40. For example, the memory 42 may store a system program, an application program, a database, and the like. The information stored in the memory 42 may be updated with, for example, information acquired from the network 60 via the communication interface 43.

The communication interface 43 includes at least one interface for communication. The interface for communication is compliant with, for example, a mobile communication standard, mobile communication standards such as 4G or 5G, a wired LAN standard, or a wireless LAN standard but is not limited to these and may be compliant with any communication standard. For example, an in-vehicle communication device such as a Data Communication Module (DCM) may function as the communication interface 43. The communication interface 43 receives information to be used for the operations of the vehicle 40 and transmits information obtained by the operations of the vehicle 40.

The input interface 44 includes at least one interface for input. The interface for input is, for example, a physical key, a capacitive key, a pointing device, a touch screen integrally provided with a display, or a microphone. The input interface 44 accepts an operation for inputting information to be used for the operations of the vehicle 40. The input interface 44 may be connected to the vehicle 40 as an external input device, instead of being provided in the vehicle 40. As the connection method, any technology such as USB, HDMI®, or Bluetooth® can be used.

The output interface 45 includes at least one interface for output. The interface for output is, for example, a display or a speaker. The display is, for example, an LCD or an organic EL display. The output interface 45 outputs information obtained by the operations of the vehicle 40. The output interface 45, instead of being included in the vehicle 40, may be connected to the vehicle 40 as an external output device. As the connection method, any technology such as USB, HDMI®, or Bluetooth® can be used.

The positioner 46 includes at least one GNSS receiver. GNSS includes, for example, GPS, QZSS, BeiDou, GLO-NASS, and/or Galileo. QZSS satellites are called quasi-zenith satellites. The positioner 46 measures the position of the vehicle 40.

The functions of the vehicle 40 are realized by executing an arbitrary vehicle program by a processor as the controller 41. That is, the functions of the vehicle 40 are realized by software. The vehicle program causes a computer to execute the operations of the vehicle 40, thereby causing the computer to function as the vehicle 40. That is, the computer executes the operations of the vehicle 40 in accordance with the vehicle program to thereby function as the vehicle 40.

Some or all of the functions of the vehicle 40 may be realized by programmable circuitry or dedicated circuitry as the controller 41. That is, some or all of the functions of the vehicle 40 may be realized by hardware.

Operations of the controller 21 of the control apparatus 20 in the system 3 will be described with reference to FIG. 6. These operations correspond to a control method according to the present embodiment.

Steps S301 through S304 in FIG. 6 are similar to steps S101 through S104 in FIG. 2 according to the first embodiment, and hence a description thereof is omitted.

In step S305, the controller 21 communicates with the vehicles 40 traveling to the building B, measures the number of people heading to the building B based on vehicle position information indicating positions of the vehicles 40, and acquires a measurement result as the third information.

Specifically, the controller 21 first identifies the vehicles 40 traveling to the building B and communicates with the vehicles 40. Any method may be employed to identify the vehicles 40 traveling to the building B. For example, the controller 21 acquires vehicle position information indicating positions of multiple vehicles within a predetermined range from the building B, and in a case in which the vehicle position information indicates that one or more of the vehicles are traveling to the building B on predetermined roads leading to the building B, the controller 21 may identify the vehicles as the vehicles 40 traveling to the building B.

For example, the controller 21 may identify vehicles whose destinations are set to the target building B in route guidance applications, as the vehicles 40 traveling to the building B. Not limited to this, the controller 21 may identify pre-registered vehicles occupied by people working in the building B, as the vehicles 40 traveling to the building B.

The controller 21 calculates, from the vehicle position information indicating the position of each of the identified vehicles 40, an estimated arrival time at the building B by calculating a traveling speed and a traveling direction. In a case in which the estimated arrival time is in the future target time period, the controller 21 acquires information indicating the number of people in the vehicle 40. Any method may be employed to acquire the information indicating the number of people in the vehicle 40. For example, the controller 21 may request the vehicle 40 to transmit the information indicating the number of people in the vehicle 40. In this case, in response to the request, the controller 41 of the vehicle 40 detects the number of people in the vehicle 40 by any sensor, such as a seat sensor, and transmits a detection result to the control apparatus 20 as the information indicating the number of people in the vehicle 40. The controller 21 of the control apparatus 20 may acquire the third information by receiving the information. Not limited to this, the controller 21 may identify, based on the vehicle position information, a camera on a road on which the vehicle 40 is traveling and communicate with the camera to receive an image of the traveling vehicle 40 from the camera. The controller 21 may acquire the third information by analyzing the image to detect the number of people in the vehicle 40.

In a case in which the pre-registered vehicles occupied by the people working in the building B are identified as the vehicles 40 traveling to the building B, the controller 21 may acquire, as the third information, the number of people that is pre-registered as the number of people occupying the vehicles 40, when each of the vehicles 40 travels along a predetermined route. The predetermined route may be pre-registered as a commuting route.

Steps S306 through S314 in FIG. 6 are similar to steps S106 through S114 in FIG. 2 according to the first embodiment, and hence a description thereof is omitted.

According to the present embodiment, the controller 21 can more accurately predict how much the number of people in the building B increases during the future target time period, taking into account the people commuting to the building by the vehicles 40. Therefore, accuracy in prediction on the demand for electrical energy for the building B during the future target time period is improved. Therefore, technology for predicting demands for electrical energy by taking into account flows of people into buildings can be improved.

The invention claimed is:

1. A control apparatus comprising a controller configured to:

acquire first information indicating a number of people in a target building during a predetermined time period, second information indicating electrical energy consumed in the target building during the predetermined time period, and third information indicating a number of people heading to the target building during the predetermined time period;

estimate, based on the first information, the second information, and the third information, a demand for electrical energy for the building for a future target time period; and transmit the estimated demand for electrical energy for the building for the future target time period to a server to cause the server to control one or more load apparatuses to reduce usage of electrical energy based on the estimated demand for electrical energy for the future target time period to ensure that sufficient electrical energy is available for the building, wherein the control apparatus further comprises a communication interface, and the controller is further configured to:

communicate via the communication interface with a vehicle traveling to the building;

measure a number of people heading to the building based on vehicle position information indicating a position of the vehicle; and acquire the third information according to the number of people heading to the building based on the vehicle position information indicating the position of the vehicle.

2. The control apparatus according to claim 1, wherein the controller is configured to:

acquire passage information indicating a record of passage through an entrance gate of the building;

measure a number of people in the building based on the passage information; and acquire a measurement result as the first information.

3. The control apparatus according to claim 1, wherein the controller is configured to:

communicate via the communication interface with a camera installed in the building;

measure a number of people in the building based on an image captured by the camera; and acquire a measurement result as the first information.

4. The control apparatus according to claim 1, wherein the controller is further configured to:

communicate via the communication interface with a camera installed on a road leading to the building;

measure a number of people heading to the building based on an image captured by the camera; and acquire the third information according to the number of people heading to the building based on the vehicle position information indicating the position of the vehicle and the number of people heading to the building based on the image captured by the camera.

5. The control apparatus according to claim 1, wherein the controller is further configured to:

communicate via the communication interface with a terminal apparatus held by a person traveling to the building;

measure a number of people heading to the building based on terminal position information indicating a position of the terminal apparatus; and acquire the third information according to the number of people heading to the building based on the vehicle position information indicating the position of the vehicle and the number of people heading to the building based on the terminal position information indicating the position of the terminal apparatus.

6. The control apparatus according to claim 1, wherein the controller is configured to:

measure a number of people in the building based on whether people working in the building are telecommuting; and acquire a measurement result as the first information.

7. The control apparatus according to claim 1, wherein the controller is configured to:

acquire attendance information indicating attendance status of people working in the building;

measure a number of people in the building based on the attendance information; and acquire a measurement result as the first information.

8. The control apparatus according to claim 1, wherein the controller is further configured to:

acquire climate information indicating a climate at a location in which the building is present; and estimate the demand for electrical energy based on the climate information.

9. A control method performed by a computer, the control method comprising:

acquiring first information indicating a number of people in a target building during a predetermined time period, second information indicating electrical energy consumed in the target building during the predetermined time period, and third information indicating a number of people heading to the target building during the predetermined time period;

estimating, based on the first information, the second information, and the third information, a demand for electrical energy for the building for a future target time period; and transmitting the estimated demand for electrical energy for the building for the future target time period to a server to cause the server to control one or more load apparatuses to reduce usage of electrical energy based on the estimated demand for electrical energy for the future target time period to ensure that sufficient electrical energy is available for the building, wherein the computer includes a communication interface, and the control method further comprises:

communicating via the communication interface with a vehicle traveling to the building;

measuring a number of people heading to the building based on vehicle position information indicating a position of the vehicle; and acquiring the third information according to the number of people heading to the building based on the vehicle position information indicating the position of the vehicle.

10. The control method according to claim 9, further comprising:

acquiring passage information indicating a record of passage through an entrance gate of the building;

measuring a number of people in the building based on the passage information; and acquiring a measurement result as the first information.

11. The control method according to claim 9, wherein the control method further comprises:

communicating via the communication interface with a camera installed in the building;

measuring a number of people in the building based on an image captured by the camera; and acquiring a measurement result as the first information.

12. The control method according to claim 11, further comprising:

communicating via the communication interface with a camera installed on a road leading to the building;

measuring a number of people heading to the building based on an image captured by the camera; and acquiring the third information according to the number of people heading to the building based on the vehicle position information indicating the position of the vehicle and the number of people heading to the building based on the image captured by the camera.

13. The control method according to claim 11, further comprising:

communicating via the communication interface with a terminal apparatus held by a person traveling to the building;

measuring a number of people heading to the building based on terminal position information indicating a position of the terminal apparatus; and acquiring the third information according to the number of people heading to the building based on the vehicle position information indicating the position of the vehicle and the number of people heading to the building based on the terminal position information indicating the position of the terminal apparatus.

14. The control method according to claim 9, further comprising:

measuring a number of people in the building based on whether people working in the building are telecommuting; and acquiring a measurement result as the first information.

15. The control method according to claim 9, further comprising:

acquiring attendance information indicating attendance status of people working in the building;

measuring a number of people in the building based on the attendance information; and acquiring a measurement result as the first information.

16. The control method according to claim 9, further comprising:

acquiring climate information indicating a climate at a location in which the building is present; and estimating the demand for electrical energy based on the climate information.

17. A non-transitory computer readable medium storing a program configured to cause a computer to execute operations, the operations comprising:

acquiring first information indicating a number of people in a target building during a predetermined time period, second information indicating electrical energy consumed in the target building during the predetermined time period, and third information indicating a number of people heading to the target building during the predetermined time period;

estimating, based on the first information, the second information, and the third information, a demand for electrical energy for the building for a future target time period; and transmitting the estimated demand for electrical energy for the building for the future target time period to a server to cause the server to control one or more load apparatuses to reduce usage of electrical energy based on the estimated demand for electrical energy for the future target time period to ensure that sufficient electrical energy is available for the building, wherein the computer includes a communication interface, and the operations further comprise:

communicating via the communication interface with a vehicle traveling to the building;

measuring a number of people heading to the building based on vehicle position information indicating a position of the vehicle; and acquiring the third information according to the number of people heading to the building based on the vehicle position information indicating the position of the vehicle.

18. The non-transitory computer readable medium according to claim 17, wherein the operations further comprise:

communicating via the communication interface with a camera installed in the building;

measuring a number of people in the building based on an image captured by the camera; and acquiring a measurement result as the first information.

* * * * *